United States Patent Office 3,242,134
Patented Mar. 22, 1966

3,242,134
POLYCARBONATES STABILIZED WITH A MANGANESE SALT IN COMBINATION WITH HYPOPHOSPHOROUS ACID
Patrick V. Papero, Jr., Chester, Va., assignor to Allied Chemical Corporation, New York, N.Y., a corporation of New York
No Drawing. Filed Oct. 29, 1964, Ser. No. 407,546
8 Claims. (Cl. 260—45.75)

This invention relates to production of nylon (i.e. a synthetic polymeric fiber-forming polycarbonamide) of good light stability and good freedom from color. This application is a continuation-in-part of my copending application Serial Number 146,450 filed October 20, 1961, now abandoned entitled "Light-Stabilized Nylon."

Light stability of nylons, especially stability to ultraviolet light under outdoor weathering conditions, is not as good as desirable, particularly when the nylon has been dulled by incorporating titanium dioxide therein.

It has been proposed to impart light stability to polymers such as especially polyamides by incorporating various salts of manganese therein in small quantities especially quantities such as provide 10–100 p.p.m. of manganese in the polymer. A problem arises from thus using manganese salts, namely that they tend to impart color to the polymer upon heating and/or upon subjecting the polymer containing the salts to oxidizing conditions as when a textile from polymer containing a manganese salt is bleached with e.g. a chlorite. To minimize such color development it has been proposed to employ in the polyamide a manganese salt having a reducing anion, such as specifically manganese hypophosphite.

However, manganese hypophosphite is insoluble in nylon-forming reaction mixtures to an appreciable extent. This makes incorporation of this stabilizer system in the finished nylon difficult, leaving portions of the nylon unstabilized. These portions therefore do not have the desired breaking strength stability provided by the manganese and represent breaking points in nylon filaments and fibers. Furthermore, use of such a system as proposed does not permit the variation of the amount of reducing anion e.g. hypophosphite independently of the manganese cation.

I have now found, surprisingly, that good light stability and superior freedom from color are imparted to nylon such as in particular polycaproamide by including in a liquid reaction mixture of polyamide-forming reactants a soluble salt of divalent manganese completely dissolved in said reaction mixture, such as particularly manganous chloride; and including also hypophosphorous acid dissolved in the reaction mixture in amounts of at least about 1 gram-molecular weight per gram-atomic weight of manganese therein.

Conditions as used in hydrolytic polymerization processes are suitable in my process. By a "hydrolytic" polymerization process I mean any of the processes wherein water or hydrolysis products of the starting material or of the end products are present in the polymerization, e.g. as in Schlack U.S. Patent 2,241,321 of March 6, 1941.

The compositions resulting from polymerization with my reaction mixtures generally prove to have better color than like compositions similarly prepared but utilizing manganous hypophosphite instead of soluble manganous salt/hypophosphorous acid in the polymerization reaction mixture. Use of at least 2 or more preferably about 4 gram-molecular weights hypophosphorous acid per gram-atomic weight manganese dissolved in the reaction mixture particularly provides nylon having a remarkably high degree of color stabilization. However, use of amounts of hypophosphorous acid to manganese of between 1 and 2 gram-molecular weights hypophosphorous acid per gram-atomic weight manganese particularly in pigmented or highly delustered nylons provides good initial color on the nylon without any impairment of the breaking strength stabilization imparted by the manganese. The unexpected improvements imparted through use of hypophosphorous acid and manganese according to this invention appears to be specific to these ingredients. Even in the presence of hypophosphorous acid, the manganous salts used in my process, such as manganous chloride, in the amounts employed are soluble in liquid polyamide-forming reaction mixtures such as epsilon-caprolactam (hereinafter generally called simply caprolactam, or lactam, for brevity); whereas manganous hypophosphite in equivalent amounts based on manganese is insoluble therein. Moreover, the manganous chloride and hypophosphorous acid dissolved in my caprolactam polymerization reaction mixtures do not form a permanent precipitate therein. At most, a precipitate is transiently formed upon heating the reaction mixture to about 200° C.; which precipitate redissolves on further heating to temperatures of about 220° C. and up to about 300° C. in which range, as is well known, hydrolytic polymerization to form polyamides is usually conducted.

Another factor besides solubilities which at least theoretically may play a role in the process of my invention is the purity of the amide-forming starting material. I have found that color may develop much more readily and intensely upon heating lactam solutions of manganese salts when the lactam used comes from one source as compared to another. One cause of coloration may accordingly be interaction of divalent manganese and trace impurities under heat and/or oxidizing conditions. I have found, consistently therewith, that amounts of hypophosphorous acid in excess of the above cited minimum further improve the color of my polymer products especially over 2 gram-molecular weights $H_3PO_2$ per gram-atomic weight manganese. Thus striking improvement is obtained with the usual quality of lactam upon increasing the proportion of hypophosphorous acid used to at least 4 gram-molecular weights per gram-atomic weight of manganese present. I do not intend, however, that my invention be construed as limited by any mere theory.

The manganous salts are effective in the process of my invention over a wide range of concentrations. Thus excellent results, i.e. protection from both color development and strength degradation are obtained when amounts as low as about 5 parts per million of manganese ("p.p.m.") by weight based on linear polyamide are used. Usually an amount within the range of about 5 to 500 p.p.m. manganese added as the manganous salts is suitable. Larger amounts can be used but in most instances such larger amounts do not substantially increase the protection obtained and excessive amounts impart an objectionable color to the polyamide.

The amounts of manganese and hypophosphorus acid to be used will depend upon the degree and type of delustering agent or pigment in the polymer. For instance, certain delustered nylon having about 2% titanium dioxide, e.g. full dull nylon yarn is adequately stabilized for breaking strength and initial color using say 30 p.p.m. manganese as $MnCl_2 \cdot 4H_2O$ and 40 p.p.m. $H_3PO_2$, a ratio of 1.1 gram-molecular weights $H_3PO_2$ per gram atomic-weight manganese. It is to be realized, however, that initial color is substantially better when employing in the liquid reaction mixture of polyamide forming reactants at least 2 and preferably 4 or more gram-molecular weights $H_3PO_2$ per gram-atomic weight of manganese dissolved therein.

The linear polyamides or nylons stabilized according to the present invention are those polymers which contain plural repetitive chain segments linked by carboxyamido groups and which can be extruded from a melt, drawn and molecularly oriented to form filaments. Among such linear polyamides, the following are typical examples:

Nylon 6—from epsilon-caprolactam
Nylon 6, 6—from hexamethylene diamine and adipic acid
Nylon 6, 10—from hexamethylene diamine and sebacic acid
Nylon 11—from omega-amino undecanoic acid These linear polyamides and others of similar structure are all capable of being rendered color-stable and protected from deterioration by light, weathering and bleaching treatments by the inclusion therein of a soluble manganous salt and at least 1 gram-molecular weight of hypophosphorous acid per gram-atomic weight of manganese according to the present invention.

The invention will be illustrated by the following examples in which parts and percentages are by weight and the temperatures are expressed in degrees centigrade. These examples are illustrative and set forth the best mode contemplated by me of carrying out my invention but are not intended to be limiting since variations in the specific details disclosed, which variations are within the scope and spirit of the invention, will be readily apparent to those skilled in this art.

EXAMPLE I

In order to demonstrate the effect of mixtures of hypophosphorous acid and manganous salts on the color of linear polyamides, a series of polycaproamides delustered with 0.3% $TiO_2$, each containing 30 p.p.m. of manganese and hypophosphorous acid in the amounts shown in the table below were prepared in the following manner.

A molten mixture of caprolactam containing about 1% water, 30 p.p.m. manganese added as crystallized manganous chloride tetrahydrate ($MnCl_2 \cdot 4H_2O$ reagent grade) or as manganous hypophosphite mono-hydrate ($Mn(H_2PO_2)_2 \cdot H_2O$), and hypophosphorous acid in the amounts indicated below, was heated in a glass resin flask equipped with a heating mantle, a type 316 stainless steel horseshoe agitator, stuffing box, thermocouple, thermowell, inert gas inlet, condenser, receiver and gas outlet bubbler tube. The flask was purged with dry inert gas containing less than 5 p.p.m. oxygen and heated to effect polymerization as follows while maintaining a slight superatmospheric pressure of inert gas over the polymer:

1 hour to 195° C.
3 hours 195 to 255° C.
12 hours at 255° C.

Water and a small amount of caprolactam, distilled during this period, were collected in the receiver. When the temperature reached 255° C., the clear mass was charged with 1.2 wgt. percent of a master batch polymer composed of 25% $TiO_2$ delustrant (anatase type) and 75% polycaproamide.

At the end of the polymerization period, the agitator and thermowell were withdrawn from the polymer and the mass was allowed to cool for about 12 hours. The solid bar of polymer thus obtained was removed, cut into ½ inch cubes, ground to 20 mesh U.S. standard screen size and extracted by agitation in 2000 parts of distilled water at 100° C. for 2 hours. The polymer was subjected to 5 successive washings in this manner. The washed polymer was then dried in a vacuum oven (pressure about 15 mm. Hg abs.) at 85° C. for 48 hours.

A typical analysis of washed and dried polymer was:

Reduced viscosity at 0.5% concentration and 25°
  C. in m-cresol _____ 1.5
Water extractables _____ 1.2%
Water _____ Less than 0.1%

The color of the polymer particles (powder) obtained in each case, washed and dried, was determined by means of a device for measuring color known as the "Color-Eye" Model 500016, manufactured by Instruments Development Laboratories, Inc., Boston, Mass. In this instrument an amber filter, a blue filter, and a green filter are inserted successively and the three readings (A, B, G) obtained with each upon the sample are used to determine yellowness index of the sample (Y.I.) employing the formula:

$$Y.I. = \frac{A-B}{G} \times 100 + 100$$

Y.I. values above 100 correspond to yellowness; e.g. about 110 represents a distinct yellow cast; a sample with Y.I. of 105 is just faintly yellow; and values near 100 mean colorless. Values below 100 correspond to bluish tints.

The data obtained are set out in the table below:

Table I
COLOR OF LIGHT STABILIZED POLYCAPROAMIDE

| Batch No.[1] | H($H_2PO_2$), p.p.m. | Color Eye Analysis |
| --- | --- | --- |
| 1 | 0 | 109.3 |
| 2 | 18 | 109.1 |
| 3 | 36 | 109.5 |
| 4 | 54 | 109.5 |
| 5 | ([2]) | 108.2 |
| 6 | [3] 72 | 106.3 |
| 7 | 73 | 105.3 |
| 8 | 146 | 102.9 |
| 9 | 146 | 100.6 |

[1] 30 p.p.m. Mn added, using crystallized magnanous chloride tetrahydrate unless otherwise noted.
[2] Manganous hypophosphite monohydrate used.
[3] 2 gram-molecular weights per gram-atomic weight of manganese.

It can be readily seen that polycaproamide stabilized with manganous chloride (30 p.p.m. manganese) alone has a yellow cast, and that use of manganous hypophosphite at the same manganese level gives only minor improvement. Addition of at about 2 gram-molecular weights of hypophosphorous acid per gram-atomic weight of manganese results in a substantial improvement in the color of the stabilized polymer; and addition of 4 gram-molecular weights of hypophosphorous acid per gram-atomic weight of manganese gives very striking improvement.

Still more hypophosphorous acid can be added, up to the point of its being uneconomic, and suitably up to about 5% by weight on the polyamide if desired.

EXAMPLE II (A) To a charge of epsilon-caprolactam containing about 0.95% water and 0.3% titanium dioxide, 30 p.p.m. of manganese as manganous chloride tetrahydrate $$(MnCl_2 \cdot 4H_2O)$$

and 72 p.p.m. hypophosphorous acid were added and the mass was polymerized generally as described in Example I except that in the first hour of heating up, 90°–150°, the reactor was closed off so that pressure built up to 40 p.s.i.g.; this pressure was released over the next 2 hours during heat up to 255° C. The final heating period at 255° C. was thereby shortened to 5 hours.

The washed and dried polymer had good white color. Its relative viscosity in formic acid solution (ASTM Method No. D-789–53T) was 57.2; and percent extractable by boiling water=1.09%.

The polymer was melted in a screw extruder, the melt was forced through a spinning pack and the resulting yarn was drawn into 200 denier, 32 filament continuous yarn.

A sample of this yarn was wound on a 2 x 2 in. aluminum tube and exposed in an Atlas Weather-O-Meter for 92 hours during which period distilled water was sprayed over the sample for 9 minutes during each hour of exposure. The yarn retained 96% of its original breaking strength after exposure.

A duplicate sample of this yarn was exposed for 96 hours in a U.V. (i.e. ultraviolet light) cabinet containing a germicidal tube, 2 fluorescent sunlight tubes and 2 black light tubes to produce radiation covering the range of 2400 to 4000 A. The sample of stabilized yarn retained 82% of its breaking strength after having been thus exposed.

The yarn was wound in a single layer on a 2 x 6 in. aluminum tube and exposed at a 45 degree angle facing due south in Chesterfield County, Virginia. After 120 days of this outdoor exposure the stabilized yarn retained 81% of its original breaking strength.

(B-1) Polycaproamide prepared as in part (A) of this example, and polycaproamide similarly prepared but using 30 p.p.m. of manganese added as the hypophosphite, were tested as above as 115 denier, 19 filament yarns. The polymer of this example part (A) was superior in the U.V. test and at least equal in the other tests.

(B-2) Yarn made using a doubled quantity of hypophosphorous acid with otherwise the above procedure (B-1) was similar to the yarn of part (B-1) except it showed higher outdoor weathering stability.

Non-stabilized delustered nylon yarn prepared in the same general manner above outlined in part (A) (32 filament, 200 denier) retained only 57% of its original breaking strength after Weather-O-Meter exposure as above and only 26% of its original strength after 30 days' outdoor exposure as above.

EXAMPLE III

A polycaproamide delustered with 0.3% $TiO_2$ and containing 10 p.p.m. manganese and 48 p.p.m. of hypophosphorous acid as stabilizers was prepared generally as described in Example II except that the $TiO_2$ was added in the master batch form of Example I after 2 hours at 255°. The final washed and dried polymer had relative viscosity in formic acid (ASTM D-789-53T) of 35.4, boiling water extractables of 0.94%, and Color Eye analysis of 100.9 showing very good white color. A yarn prepared from this polymer as outlined in Example II (32 filament, 200 denier) was tested for weatherability and light stability as described in Example II. The results were as follows (given in percent retention of original breaking strength):

| | Percent |
|---|---|
| Weather-O-Meter | 84 |
| U.V. cabinet | 81 |
| Outdoor exposure | [1]62 |

[1] After 150 days.

EXAMPLE IV

The following examples illustrate the effect of a heavier concentration of dulling agent on light stability and polymer color. The polymers in this example contain 2.0% $TiO_2$ which is the amount contained in commercial "Full Dull" nylon yarn. It will be noted that in contrast to Example I using only 0.3% $TiO_2$ content a proportion of 1 gram molecular weight of hypophosphorous acid is sufficient to guarantee good polymer color (i.e. a polymer yellowness index of less than 108).

Polymers were prepared by melting 1520 grams caprolactam, 80 grams epsilon amino caproic acid, and the proper amount of $MnCl_2 \cdot 4H_2O$ and 50% aqueous $H_3PO_2$ solution to obtain the concentrations designated in the following table. The polymerization procedure was: the melted components were added to a 3 liter resin flask containing horseshoe agitator, condenser, and nitrogen inlet. This flask was heated by means of an electric mantle until a temperature of 255° C. was registered by a thermocouple inside the mass. An agitation speed of 30 r.p.m. and a nitrogen sweep rate of 15 cc./min. were used throughout the polymerization cycle. After 1 hour the batch started to increase in viscosity. At this point 124 grams of a 25% $TiO_2$ master batch prepared as in Example I, was added through a charging port.

The polymerization was continued until the time at 255° C. was 5.0 hours after which the mass was extruded from a port at the bottom of the flask into a water quench trough and taken up on a reel. The polymers were washed, dried, spun, drawn, and tested as in the previous examples. The results are shown in the following table; wherein the tests reported were performed as above described in Example II.

*Table 2*

EFFECT OF Mn++ AND $H_3PO_2$ CONCENTRATIONS ON LIGHT STABILITY AND COLOR OF NYLON 6 FULL DULL YARN

| Batch No. | P.p.m. Mn++ | P.p.m. $H_3PO_2$ | Gram-molecular wt. $H_3PO_2$:Mn | Color Eye Analysis | Percent Strength Retained | | |
|---|---|---|---|---|---|---|---|
| | | | | | Weather-O-Meter | Outdoor Exposure | |
| | | | | | | 30 | 60 |
| 1 | 30 | 0 | 0 | 110.5 | 56 | 72 | 48 |
| 2 | 30 | 40 | 1.1 | 107.7 | 72 | 72 | 49 |
| 3 | 30 | 54 | 1.5 | 107.2 | 58 | 78 | 56 |
| 4 | 30 | 72 | 2 | 107.1 | 77 | 75 | 54 |
| 5 | 30 | 80 | 2.22 | 106.5 | 65 | 69 | 46 |
| 6 | 30 | 108 | 3.0 | 106.1 | 69 | 73 | 52 |
| 7 | 30 | 144 | 4.0 | 105.9 | 63 | 68 | 48 |

In order to illustrate that the manganese added to the polyamide forming reactants is completely dissolved therein together with the hypophosphorous acid employed, the following solubility test is set forth.

*Solubility test*

100 gram samples of e-caprolactam were maintained molten at 80° C. and stirred for 5 minutes with:

(a) Duplicate samples of 0.036 g.

$$MnCl_2 \cdot 4H_2O + 0.0454$$

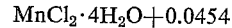

g. of aqueous 50% $H(H_2PO_2)$; i.e. 100 p.p.m. (parts per million) of Mn on the lactam and 113 p.p.m. of P (2 molecular equivalents of hypophosphorous acid per molecular equivalent of $MnCl_2$).

(b) Duplicate samples of 0.037 g. $Mn(H_2PO_2)_2 \cdot H_2O$ powder, i.e. 100 p.p.m. of Mn and 113 p.p.m. of P.

The solids in part (a) were seen to dissolve in the molten lactam while in part (b) solid remained in suspension. The molten caprolactam from each of the tests was filtered through #42 paper; and the filtrates were analyzed for Mn (and also for P in part (a), as a further check). The results were:

(a) Mn in filtrates (p.p.m.) _____ 98, 98
    P in filtrates (p.p.m.) _____ 108, 100
(b) Mn in filtrates (p.p.m.) _____ 4, 4

Thus in part (a) practically all of the two additives was found in the filtrates, whereas in part (b) the Mn compound was indicated to be soluble only to the extent of 4 p.p.m. in the lactam.

This solubility offers technical advantages since it facilitates production of polymer with the stabilizer well dispersed throughout to provide maximum stabilizing effect and no interference with spinning even through very fine holes.

As above stated, manganous salts soluble in the polymerization reaction mixture can be used in general in accordance with my invention. Specific manganous salts which can be substituted for manganous chloride tetrahydrate in the procedures of the above examples with broadly similar results include organic salts such as the acetate, the lactate, the tartrate, the salicylate, the p-toluene-sulfonate, etc.; and inorganic salts such as the nitrate.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. In a process for producing a light stabilized synthet- 1. ic polymeric fiber forming polycarbonamide, the improvement which comprises including in a liquid polycarbonamide forming polymerization reaction mixture, a soluble salt of divalent manganese completely dissolved in the reaction mixture, the amount of manganese being in the range of between 5 p.p.m. and 500 p.p.m. based on the weight of the polycarbonamide-forming reactants therein, and hypophosphorous acid dissolved in the reaction mixture in amounts of between 1 gram-molecular weight per gram-atomic weight of manganese and 5% based on the weight of the polycarbonamide forming reactants.

2. Improvements as defined in claim 1 wherein the amount of hypophosphorous acid dissolved in the reaction mixture is at least 2 gram-molecular weights per gram-atomic weight manganese.

3. Improvements as defined in claim 1 wherein titanium dioxide is included in the polymerization reaction mixture as delustrant for the polycarbonamide.

4. Process for producing by hydrolytic polymerization of epsilon-caprolactam a light-stable substantially color-free polycaproamide which comprises forming a liquid reaction mixture for said polymerization which reaction mixture includes completely dissolved manganous chloride in amounts providing at least 5 parts per million by weight in the reaction mixture of manganese, and dissolved hypophosphorous acid in amounts between about 1 gram-molecular weight per gram-atomic weight of manganese and about 5% based on the weight of the polycaproamide forming reactants; and maintaining said reaction mixture at temperatures in the range of 220° C.–300° C. at which polymerization occurs therein.

5. Process as defined in claim 4 wherein the amount of manganese is in the range of about 10–100 p.p.m., titanium dioxide is included in the polymerization reaction mixture as delustrant for the polycaproamide, and the amount of hypophosphorous acid included in the reaction mixture is about 4 gram-molecular weights per gram-atomic weight of manganese therein.

6. A polycaproamide composition stabilized against deterioration by light and weathering, obtained by completely dissolving a salt of divalent manganese in liquid epsilon-caprolactam in amounts providing between 5 p.p.m. and 500 p.p.m. by weight in the reaction mixture of manganese, said caprolactam having also dissolved therein hypophosphorous acid in amounts of at least about 1 gram-molecular weight of acid per gram-atomic weight of manganese and not above about 5% based on the weight of the polycaproamide-forming reactants; and polymerizing the resulting reaction mixture under hydrolytic conditions at temperatures in the range of 220° to 300° C.

7. Composition as defined in claim 6 wherein there is at least about 2 gram-molecular weights of acid per gram atomic weight of manganese.

8. Composition as defined in claim 6 obtained by using manganous chloride as the manganese salt, in amounts providing about 10–100 p.p.m. of manganese, and hypophosphorous acid in amounts of about 4 gram-molecular weights per gram-atomic weight of manganese used.

No references cited.

LEON J. BERCOVITZ, *Primary Examiner.*